United States Patent [19]
Theyse

[11] 4,261,176
[45] Apr. 14, 1981

[54] THERMODYNAMIC ASSEMBLY

[75] Inventor: Frederik H. Theyse, Bergisch Gladbach, Fed. Rep. of Germany

[73] Assignee: Verenigde Machinefabrieken Stork N.V., Amsterdam, Netherlands

[21] Appl. No.: 866,162

[22] Filed: Dec. 30, 1977

[30] Foreign Application Priority Data

Dec. 30, 1976 [NL] Netherlands .......................... 7614750

[51] Int. Cl.² .................... F25B 27/00; F25B 27/02
[52] U.S. Cl. ........................................ 62/2; 62/238.4; 62/467 R
[58] Field of Search ............... 62/2, 238 C, 467 R; 60/654, 641, 671

[56] References Cited

U.S. PATENT DOCUMENTS

| | | | |
|---|---|---|---|
| 3,355,903 | 12/1967 | La Fleur | 62/467 X |
| 3,508,399 | 4/1970 | Pacault et al. | 62/467 X |
| 4,023,375 | 5/1977 | Chinnappa et al. | 62/2 |
| 4,030,312 | 6/1977 | Wallin et al. | 62/2 |
| 4,033,141 | 7/1977 | Gustafsson | 62/467 |
| 4,100,763 | 7/1978 | Brody | 62/2 |
| 4,103,493 | 8/1978 | Schoenfelder | 62/2 |

Primary Examiner—Lloyd L. King
Attorney, Agent, or Firm—Haseltine, Lake & Waters

[57] ABSTRACT

A thermodynamic installation with a closed circuit for a working medium employing a compressor and an expansion machine connected thereto; or by a transmission linked by a first heat exchanger and second heat exchanger having the working medium in the heat exchangers and expansion machine continuously in a vapor-liquid phase equilibrium and that complete circulation takes place within the vapor-liquid phase area of the temperature-entropy diagram. The installation can be employed as a heat pump or to provide energy as a turbine resulting in an increased yield.

16 Claims, 4 Drawing Figures

THERMODYNAMIC ASSEMBLY

BACKGROUND OF THE INVENTION

The invention is directed to a thermodynamic installation with a closed circuit for a working medium.

More particularly, the invention is directed to a closed circuit thermodynamic installation employing a compressor as well as an expansion machine, linked therewith by means of a shaft, or by means of a transmission, linked by a first heat exchanger and a second heat exchanger. Such installations can be used e.g. as heat pumps or as an energy providing turbine.

The present forms of such installations as is known have, however, the disadvantages of being far too expensive, too big and need to be run at a too low a rotational speed. In most cases suction machines have been used hitherto for the compression, whereas the expansion takes place over throttling means. However, this arrangement prevents use in reverse direction.

SUMMARY OF THE INVENTION

The main object of the invention is to overcome the defects of the prior installation.

Another object of the present invention is to employ the working medium both in the compressor and the expansion machine continuously in a vapor-liquid phase equilibrium.

A further object of the invention is an increase of the yield which may rise substantially, especially on application as energy circulator.

Because of the losses of the throttle means as used hitherto, are replaced by an expansion in an expansion machine, preferably a turbine, energy is reclaimed and yield is increased. In addition, since according to the invention compression takes place much more efficiently, as a consequence of which it requires less energy. The condition for this is, that the complete circulation takes place within the vapor-liquid phase area of the temperature-entropy diagram.

In the compression machine, according to the invention, preferably a flow machine of the axial, axial-centrifugal or radial type, the vapor is compressed to such an extent, that the vapor, which initially contains only a small quantity of liquid, is converted completely in dry vapor.

The reverse occurs in the turbine, in which hot liquid is introduced, which subsequently is increasingly converted in the vapor phase during the expansion. In a second heat-exchanger, positioned after the turbine, so much heat is added, that ultimately substantially saturated vapor is obtained, which in turn is introduced into the compressor. In this compressor the still slightly humid vapor is compressed to substantially dry vapor.

A first heat-exchanger is positioned behind the compressor and before the turbine which allows the working medium, consisting of dry vapor of high temperature, to pass, while heat is withdrawn therefrom. Consequently, the working medium is converted to liquid by condensation.

The first heat exchanger is used to transmit heat towards a heat transporting medium, which is linked with one or more installations for the effective use of the supplied heat, such as for example, heating radiators in domestic dwellings. In an installation of this type, the second heat exchanger, which is positioned before the compressor, is positioned in a soil mass, for the purpose of extracting solar heat, which has been accumulated therein in the course of time. This is more efficient than extracting heat from the atmosphere, which of course has a far smaller capacity for absorbing heat and which moreover as a consequence of its humidity, could provide numerous problems, especially at lower temperatures.

When the installation is intended for use as a cooling machine, the second heat-exchanger may be positioned in a space in which a lower temperature is maintained.

According to another application of the invention, the installation is assembled such that energy is provided since the first heat-exchanger positioned between the compressor and the expansion machine absorbs energy, e.g. using a collector for the absorption of solar energy. Such an installation for solar energy can then be made efficient by connecting the second heat-exchanger thermally with a cooling medium, which is withdrawn from a natural body of water. In winter this could be, for example, the water, occurring below the ice of a frozen river, lake or pool, or in summer the water, withdrawn from a deep well. In this manner, energy can be supplied to the soil for storage and later use, by positioning the heat-exchanger in the soil.

Finally, energy could be supplied to a heat storage or be delivered to the air.

The installation as described can also be incorporated in a "total energy" installation by making the second heat-exchanger receive heat of the off-gases of a "prime mover" with internal combustion. This can be e.g. a gas-turbine installation with open circuit, in which the off-gases consist of the finished gases of the turbine.

Freon as working medium can be used. An important advantage of the installation as described above is, that both the compressor and the expansion machine can be in the form of a flow machine. For the compressor portion, a compressor rotor of the axial, axial-centripetal or radial type can be used; whereas, the turbine portion can comprise a rotor of the axial, axial-centripetal or radial type. Such construction allows the use of very high rotation velocities, such as e.g. in the order of 100,000 r.p.m. Thus, very small and light aggregates are obtained, which require little space, especially when the rotor of such an aggregate is mounted vertically. At the same time this permits a very simple adjustment of the required production level by adjusting the rotational velocity in accordance with the requirements. When used as heat pump, a high rotational velocity of necessity results in a higher condensation pressure in the working medium, and therefore a high temperature results at the place of delivery.

The rotor as described with coupled turbine rotor and compressor rotor has the additional advantage, that both at the compressor portion as well as the turbine portion have substantially no temperature gradient in the axial direction since the temperature course is substantially identical in both rotors.

The invention will be better understood with respect to the accompanying specification, claims and drawings, in which:

IN THE DRAWINGS

DESCRIPTION OF THE INVENTION

Figure 1:
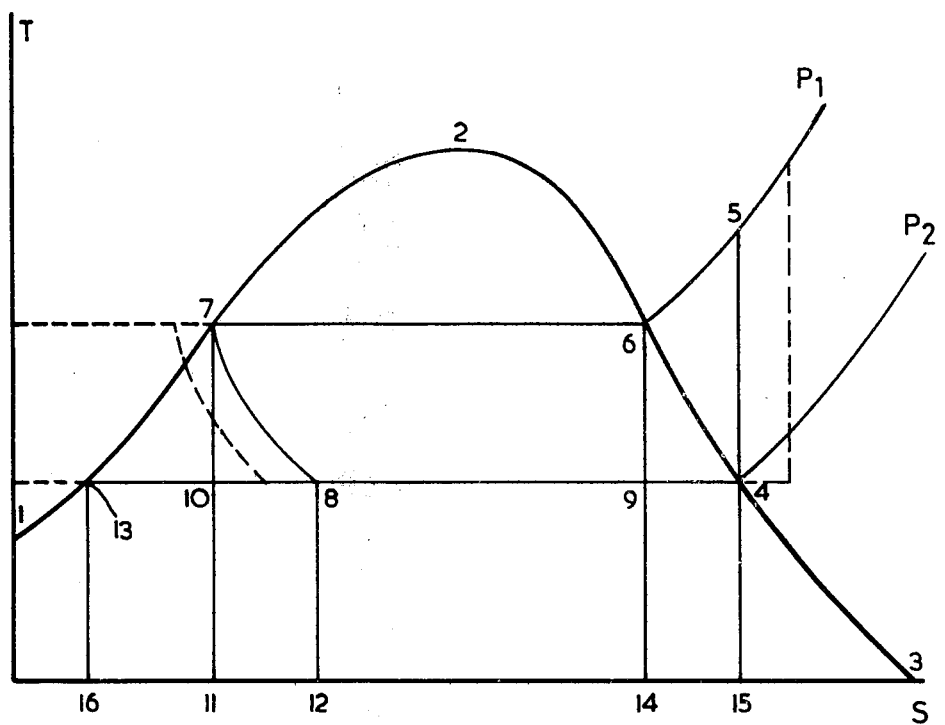
FIG. 1 represents a temperature(T)-entropy(S)-diagram in which a known cycle and the cycle according to the invention are compared with each other.

In FIG. 1 the absolute temperature T is represented along the abscis and the entropy along the ordinate. The diagram is applicable for the working medium as used in a thermodynamic installation. The line 1, 2, 3 is the border line of the area of coexistence; the part 1–2 is the liquidus line and the part 2–3 is the vapor line. The diagram also comprises a line for the constant pressure $p_1$ and a line for the constant pressure $p_2$.

The cycle as followed hitherto for a thermodynamic installation of the known type, when used as a heat pump, provides the line: 4, 5, 6, 7, 8. Along the part 4–5 the saturated vapor 4 is compressed to a superheated condition 5. In a subsequent heat-exchanger, the superheated working medium is then cooled to a saturation point 6 and is then condensed to a liquid along the line 6–7. This liquid is subjected to a throttle process, thus causing the isenthalpic phase change 7–8. The liquid-vapor mixture 8 is subsequently heated in a heat-exchanger until the condition of 4 is achieved again. Special drying steps are frequently required at this stage following the cycle and are represented by the dash lines.

In accordance with the method according to the invention, the cycle 9, 6, 7, 10, 9 is followed. Thus, a much better yield is achieved since the energy loss, caused by throtting in the known process and represented by the surface 11, 7, 8, 12, is prevented. The known process as used for a cooling machine, results in a loss of cooling delivery 10, 8, 12, 11 and this is provided as energy. Moreover, when used as cooling machine or heat pump, the part 9, 4, 5, 6 has to be provided mechanically in order to be able to transport the surface 14, 9, 4, 15.

When the process is used for providing energy, the cycles are passed in an opposite direction. The cycle as hitherto usually used is: 13, 7, 6, 5, 4, 13. However, according to the invention, this is replaced by the cycle: 10, 7, 6, 1, 10. This latter cycle is known as the Carnot cycle, and provides, as well known, a very good yield.

According to the diagram and for reasons of simplicity, the phase transitions in the turbines and compressors occur with a yield of 100%. In practice this yield is lower, but for purposes of comparison of the known cycle with the cycle according to the invention this does not play a part in the consideration.

Figure 2:
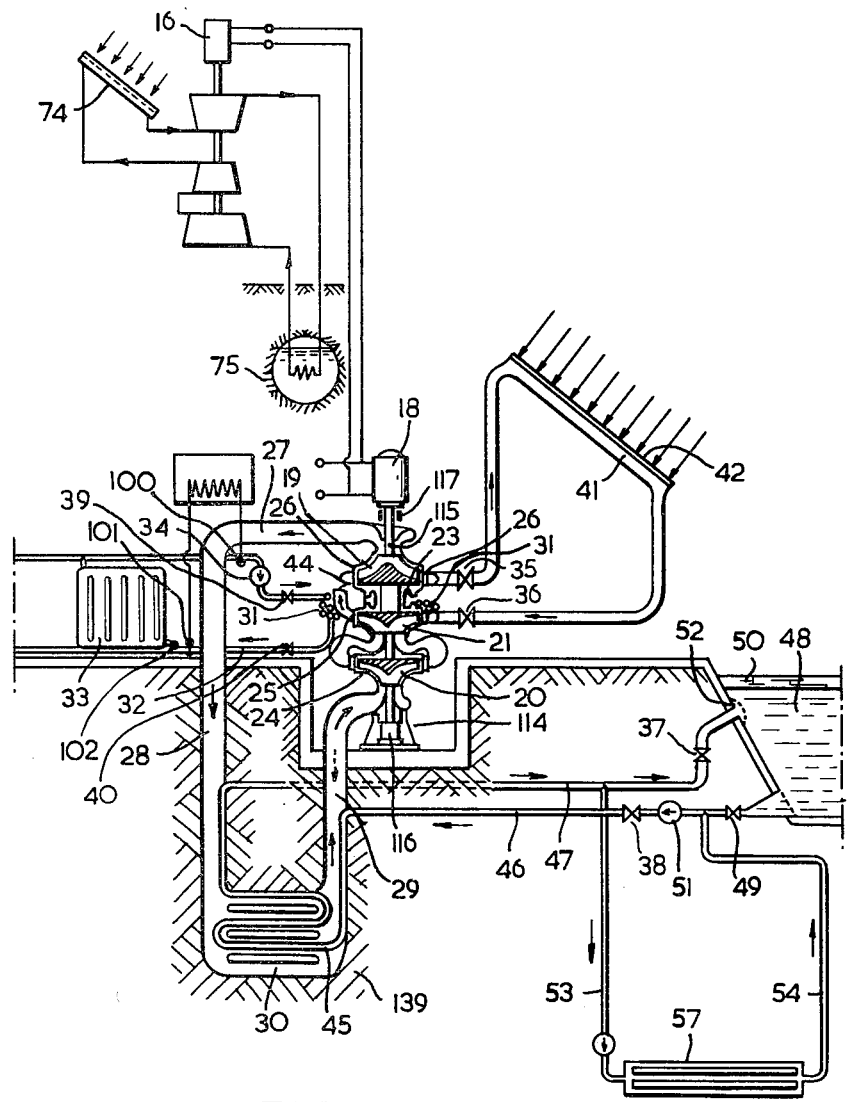
FIG. 2 represents a schematic embodiment of the various applications of a thermodynamic installation according to the invention.

FIG. 2 schematically illustrates the various ways in which the invention can be used. A vertically positioned turbo-compressor assembly 114 is provided with a shaft 115, which is positioned in bearings 116 and 117, which is linked with a drive-mechanism such as e.g. electromotor 18. A turbine rotor 19 and compressor rotors 20 and 21 are in a housing 22. The housing 22, in which the rotors are positioned, is provided with a seal 23 between compressor rotor 21 and turbine rotor 19. Guiding means 24, 25 and 26 are positioned at the outlet of the compressor rotors and the inlet of the turbine rotor.

When used as heat pump the turbo-compressor rotor is driven by an electromotor 18, which preferably consists of a brushless d.c. motor or 3-phase a.c. motor. The circuit 27, 28, 29 is filled with a working medium, such as e.g. FREON. A heat-exchanger 30 is present in the circuit and is positioned in a soil mass of such a type, that the conductivity is sufficient to provide or to absorb heat. A first heat-exchanger 31 is positioned, for example, between the compressor rotors, more particularly, behind the last compressor rotor, thus making it possible to withdraw heat of condensation to be passed through conduit 32 towards one or more heating elements, such as radiators 33, for room heating. The heat transfer medium used therein is recirculated via pump 34 towards the inlet of heat-exchanger 31.

The process when used to pump heat proceeds as follows. (Valves 35 and 36, explained below, are then closed, as well as valves 37 and 38).

The working medium absorbs heat in heat exchanger 30 from the surrounding soil mass 139. Through conduit 29 working medium as wet vapor is sucked in by the first compressor rotor 20 and the medium is compressed therein in such a way, that a rise in temperature occurs and the vapor is substantially dried. This is repeated in compressor rotor 21. As a result of the heat discharge in heat-exchanger 31, the initially dry vapor condenses, thus liquid being present in the guiding means 26 of the turbine. During the expansion in turbine rotor 19, part of this liquid is transferred into the vapor phase while cooling. Thus formed cooled liquid-vapor mixture is discharged through conduit 27, 28 towards heat-exchanger 30, in which sufficient heat is absorbed from the soil 139 to convert the mixture into wet vapor again. This vapor is then passed on to the compressor via conduit 29.

If it appears to be economically desirable, for example, when cheap electricity is available at night, extra heat can be pumped up to be stored (e.g. in salt) by opening valves 100 and 101 and closing valve 102 while simultaneously adjusting valves 39 and 40. By closing valves 39 and 40, opening valves 100 and 101 and adjusting valve 102 it is then possible to extract heat from the storage, in a similar manner it is possible to heat industrial or domestic water.

The installation as described above can also be used with the same linkage as a cooling installation. In that case, however, heat-exchanger 30 is positioned in a space (not further identified) which has to be cooled and heat-exchanger 31 is replaced, for example, an air-cooler.

With a minor modification, the installation according to the invention can also be used for generating energy. In that case, the direction of flow of the medium is in an opposite direction.

Closing valves 39, 40 and 44, allows the following: by running electromotor 18 for a short while, liquid medium flows via opened valve 35 into e.g. sun collector 41. The medium is heated by the incident sunlight on plate 42, thus vaporizing the medium which flows via opened valve 36 towards the guiding means 25 of compressor rotor 21 now functioning as a turbine, in turn the medium is subsequently expanded and flows via guiding means 24 towards compressor rotor 20, where further expansion takes place. The thus obtained expanded vapor is then further condensed in heat-exchanger 30, whereafter the liquid is transported towards the heating source by rotor 19, now functioning as a pump.

In this way, rotors 20 and 21 provide useful energy, which by having the electromotor 18, functioning as generator, can be returned to the electricity network.

This Figure also shows how energy production can be increased by making use of cool water having a lower temperature than soil mass 139. This can be achieved by introducing an additional cooling coil 45 in heat-exchanger 30, which, by means of supply conduit 46 and discharge conduit 47 is connected with a body of water 48. The valves 37, 38 and 39 are then opened. In the embodiment as shown, the body of water 48 is covered by an ice-layer 50. Pump 51 sucks off undercooled water which is transported into cooling coil 45 and from there back towards discharge 52. Similar functioning can be obtained by connecting conduits 46 and 47 to a well, providing groundwater, which is cooler than surface water. This is possible in summer. The conduits required are indicated with 53 and 54. In many instances it will be necessary to provide for an extra pump at the start of conduit 54 or at the end of conduit 53 at the bottom of the well. It is also possible to provide for a cooling heat-exchanger 57 underground. Conduit 53 serves to return the used cooling water. It is efficient that such a conduit 53 terminates at some distance from conduit 54 in the ground, in particular, when a groundwater well is used. In practice this installation can also be used, whereby, in summer, incident light is used and energy is generated while the excess heat is stored in the soil mass 139 for use during winter. This, however, does not necessarily imply the use of extra low cooling temperatures.

Figure 3:
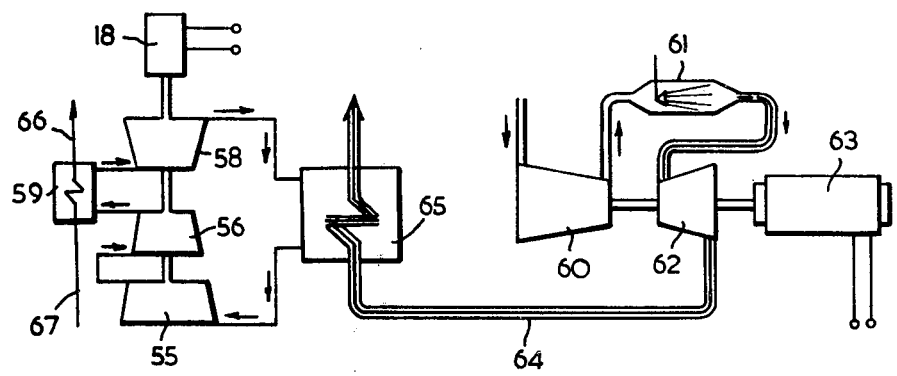
FIG. 3 represents a schematic display of a thermodynamic installation according to the invention, made as a "total energy" system.

FIG. 3 provides a schematic presentation of the way in which the thermodynamic installation as described can be connected with a gas-turbine of the open system, thus providing a so-called "total energy" installation. Compressor 55 is provided with a first heat exchanger 59 between compressor 56 and turbine 58. The gas-turbine of the open type is provided with an air compressor 60, a combustion room 61 and a gas-turbine 62. The combustion room is intended for burning fossile fuels.

The gas-turbine drives an electricity generator 63. The spent combustion gases of the gas-turbine are guided towards a second heat-exchanger 65 of the heat pump circuit by means of conduit 64. This heat pump brings the off gas heat to a higher level, thus providing a heating medium for outlet 66 of cooling conduit 67.

Instead of using the compressor turbine installation as a heat pump, the same apparatus can be employed for additional generation of electrical energy by reversing the coolers with respect to their function. Thus additional flexibility for the use of this installation is obtained.

Figure 4:
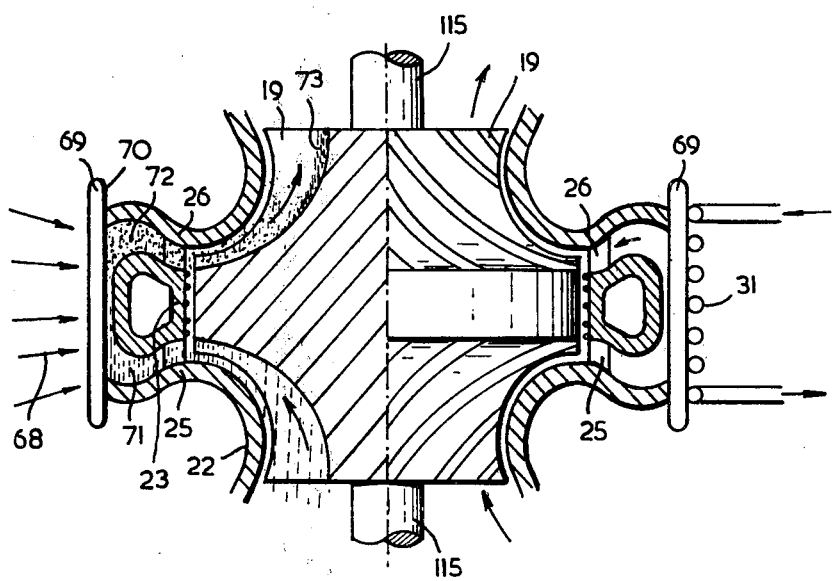
FIG. 4 represents a simplified presentation of a turbo-compressor in a housing, provided with a heat-exchanging surface between compressor and turbine.

FIG. 4 shown partially in a vertical cross-section, illustrates what happens in the rotor for two possible applications. The left half of the rotor represents the application of the installation as energy-producer. This is symbolically indicated by the incident heat flow 68, which may, for example, originate from a parabolic mirror. This heat flow is concentrated on the cooling rib 69, which covers a very thin heat permeable wall 70. Thus, the liquid 71 is converted into vapor 72, which is transported towards the turbine drive wheel 19 by the guiding means 26. In this turbine wheel, partial condensation occurs causing the formation of a liquid film 73.

The right hand half of FIG. 4, presents the application as heat pump. In this case, the compressor wheel 21 delivers substantially dry vapor in the collecting guiding means 25. As a consequence of the cooling action in heat-exchanger 31, partially created by the cooling coil and partially by cooling rib 69, this medium will condense, thus reaching the inlet of turbine drive wheel 19 in the form of a liquid.

The installation as described allows seasonal use: in summer the solar energy collector 41 (see FIG. 2) can be used and the heat can be stored in relatively cold soil 139. The heat-exchanger 30 functions in that case as cooler and simultaneously accumulates a heat source for the winter. At the same time, energy can be generated with the electrical machine 18.

During winter this heat can be taken from the soil by means of the heat pump circuit, collector 41 is not employed, but radiators 33 are linked up. In that case, energy is supplied to the electrical machine 18.

When a second installation (see FIG. 2) is used, in which a solar energy collector 74 functions, and which makes use of very cold water streams 75 for the discharge of heat, such as water derived from a well or a river, it is then possible to generate sufficient electrical energy from the accessory electrical machine 76 to run the first-mentioned electrical machine 18 of the water pump.

Many modifications and variations of the present invention are possible in light of the above teachings. It is, therefore, to be understood that within the scope of the appended claims, the invention may be practiced otherwise than as particularly described.

What is claimed is:

1. A thermodynamic apparatus having a working medium in a closed cycle wherein: drive means being connected to turbine means for driving said turbine means; said turbine means having inlet means for introducing hot liquid for conversion to vapor therein; second heat exchange means disposed downstream of said turbine means and in circuit relation therewith, for receiving vapor from said turbine means to form saturated vapor; compressor means connected to said second heat exchange means for receiving said saturated vapor and being adapted to compress said saturated vapor into dry vapor; first heat exchange means disposed behind said compressor means and upstream of said turbine means, being in circuit relation with said compressor means, for receiving said dry vapor and causing heat to be withdrawn through outlet means formed of said first heat exchanger means and directed out of the system, as said working medium is converted to liquid by condensation for further circulation and pump means connected to said first heat exchange means for recirculating said medium in said apparatus being in vapor-liquid phase equilibrium.

2. An apparatus as claimed in claim 1, wherein: said second heat exchange means being disposed in a soil mass for absorbing heat from an external heat source and accumulating said heat.

3. An apparatus as claimed in claim 1 wherein: said second heat exchanger being disposed on atmospheric space.

4. An apparatus as claimed in claim 1, wherein: preheat means being disposed between said compressor means and said first heat exchange means for preheating said first heat exchange means.

5. An apparatus as claimed in claim 1, wherein: said first heat exchange means being adapted to act as a solar energy collector.

6. An apparatus as claimed in claim 1, wherein: said second heat exchange means being thermally connected to a cooling medium.

7. An apparatus as claimed in claim 6, wherein: said cooling medium is water.

8. Apparatus as claimed in claim 6, wherein: said cooling medium is a soil mass.

9. An apparatus as claimed in claim 6, wherein: said cooling medium is the atmosphere.

10. An apparatus as claimed in claim 2, wherein: said second heat exchange means being in circuit relation to outlet means of a prime mover employing internal combustion whereby said second heat exchange means receives finished combustion gases of said prime mover.

11. An apparatus as claimed in claim 1, wherein said working medium comprises FREON.

12. An apparatus as claimed in claim 1, wherein: said drive means being a brushless d.c. motor.

13. An apparatus as claimed in claim 1, wherein: said drive means being a three phase a.c. motor.

14. An apparatus as claimed in claim 1, wherein: said turbine means and said compressor means being defined by an integral turbo-compressor means.

15. An apparatus as defined in claim 14, wherein: said turbo-compressor means being formed of a compressor portion having at least one compressor rotor of an axial type and a turbine portion of an axial type.

16. A thermodynamic apparatus employing a working medium in a closed cycle, wherein: said apparatus comprises, turbo-compressor means provided with a pair of compressor rotors; drive means coupled to and driving said turbo-compressor means; a fluid conducting circuit adapted to direct a heat exchange working medium therein, said circuit having a second heat exchange means disposed in circuit relation therewith; first heat exchange means disposed between said compressor rotors; pump means connected to said first heat exchange means for recirculating said medium; and conduit means for drawing heat of condensation from said circuit and directing said heat to an external location.

* * * * *